United States Patent [19]

Song

[11] Patent Number: 5,801,786
[45] Date of Patent: Sep. 1, 1998

[54] PICTURE PAUSE SELECTING APPARATUS AND METHOD FOR A DOUBLE-WIDE TELEVISION

[75] Inventor: Kwon-eui Song, Suwon, Rep. of Korea

[73] Assignee: Samsung Electronics Co., Ltd., Kyungki-do, Rep. of Korea

[21] Appl. No.: 647,661

[22] Filed: May 15, 1996

[30] Foreign Application Priority Data

Jun. 9, 1995 [KR] Rep. of Korea ............ 95-15190

[51] Int. Cl.$^6$ ................................. H04N 5/445
[52] U.S. Cl. .................. 348/564; 348/567; 348/568
[58] Field of Search ..................... 348/565, 333, 348/731, 564, 511, 567, 568; 360/10.1; 358/183; 258/183

[56] References Cited

U.S. PATENT DOCUMENTS

| | | | |
|---|---|---|---|
| 4,575,771 | 3/1986 | Oota et al. | 360/10.1 |
| 4,774,582 | 9/1988 | Hakamada et al. | 358/183 |
| 4,777,531 | 10/1988 | Hakamada et al. | 358/183 |
| 5,065,243 | 11/1991 | Katagiri | 258/183 |
| 5,285,284 | 2/1994 | Takashima et al. | 348/731 |
| 5,434,625 | 7/1995 | Willis | 348/564 |
| 5,453,796 | 9/1995 | Duffield et al. | 348/565 |
| 5,504,535 | 4/1996 | Abe | 348/565 |
| 5,576,769 | 11/1996 | Lendaro | 348/511 |
| 5,604,543 | 2/1997 | Baek | 348/564 |
| 5,635,984 | 6/1997 | Lee | 348/333 |

*Primary Examiner*—Tommy P. Chin
*Assistant Examiner*—Gims S. Philippe
*Attorney, Agent, or Firm*—Sughrue, Mion, Zinn, Macpeak & Seas, PLLC

[57] ABSTRACT

A picture pause selecting apparatus and method for a double-wide television for pausing a picture selected by a user. The apparatus operates according to the user selection regardless of the picture mode and regardless of which picture the user selects in the double-picture mode. The apparatus has first and second memories for storing each frame of the left and right picture signals. First and second switches selectively output paused signals and left and right picture signals from first and second memories. The picture pause selecting method reads the input of a picture select button of a key input portion to determine whether to select a wide-picture mode or a double-picture mode; displays a wide-picture if the wide-picture mode is selected; pauses the wide-picture if a wide-picture pause button of the key input portion is pressed during display of the wide-picture mode; displays a double-picture if the double-picture mode is selected; and pauses a left or right picture if a left or right picture pause button is pressed during display of the double-picture mode. Thus, when the picture pause button is pressed in the wide-picture mode, the wide-picture in its entirety is paused as is, and when the picture pause button is pressed in the double-picture mode, either of the left or right picture is paused.

2 Claims, 2 Drawing Sheets

PICTURE PAUSE SELECTING APPARATUS AND METHOD FOR A DOUBLE-WIDE TELEVISION

BACKGROUND OF THE INVENTION

The present invention relates to a picture pause selecting apparatus and method for use with a double-wide television, and more particularly, to a picture pause selecting apparatus and method for pausing a picture selected by a user in a double-picture mode regardless of whether the selected picture is a left or a right picture.

A conventional double-wide television is very limited in its ability to perform a picture pausing function. When a picture pause button is pressed in a wide-picture mode, the image displayed on the wide-picture does not pause as is. Instead, the picture reverts to the double-picture mode with left and right pictures and then only the right picture is paused. Also, when the picture pause button is pressed in the double-picture mode, only the right picture can be paused. Thus, if a user wants to pause the image displayed on the left picture, the image being displayed on the left picture must be shifted over to the right picture before pressing the pause button.

SUMMARY OF THE INVENTION

It is an object of the present invention to provide a picture pause selecting apparatus for pausing a wide-picture by pressing a picture pause button in the wide-picture mode or for pausing the left or right pictures in the double-picture mode according to a selection of the user.

It is another object of the present invention to provide a picture pause selecting method of pausing a wide-picture by pressing a picture pause button in the wide-picture mode or for pausing the left or right pictures in the double-picture mode according to a selection of the user.

To achieve the first object of the present invention, there is provided a picture pause selecting apparatus of a double-wide television for selectively processing left and right picture signals introduced via an antenna, comprising: a controller for outputting control signals according to the input of a key input portion; first and second memories for receiving the left and right picture signals, storing a frame of each signal according to the control signals from the controller and reading out the stored frame; a first switch for selectively outputting a paused picture signal of a frame output from the first memory or a broadcast picture signal according to the control signal from the controller; a second switch for selectively outputting a paused picture signal of a frame output from the second memory or a broadcast picture signal according to the control signal from the controller; a double/wide-picture processor for receiving the signals output from the first and second switches and processing the signals into double pictures or a wide-picture according to the control signal from the controller; and a matrix portion for converting the signal output from the double/wide-picture processor into RGB signals.

To achieve the second object of the present invention, there is provided a picture pause selecting method of a double-wide television, comprising the steps of: (a) determining whether to select a wide-picture mode or a double-picture mode by reading the input of a picture select button of a key input portion; (b) displaying a wide-picture if the wide-picture mode is selected in the step (a); (c) pausing the wide-picture if a wide-picture pause button of the key input portion is pressed during the step (b); (d) displaying a double-picture if the double-picture mode is selected in the step (a); and (e) pausing a left or right picture according to activation of a left or right picture pause button of the key input portion.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
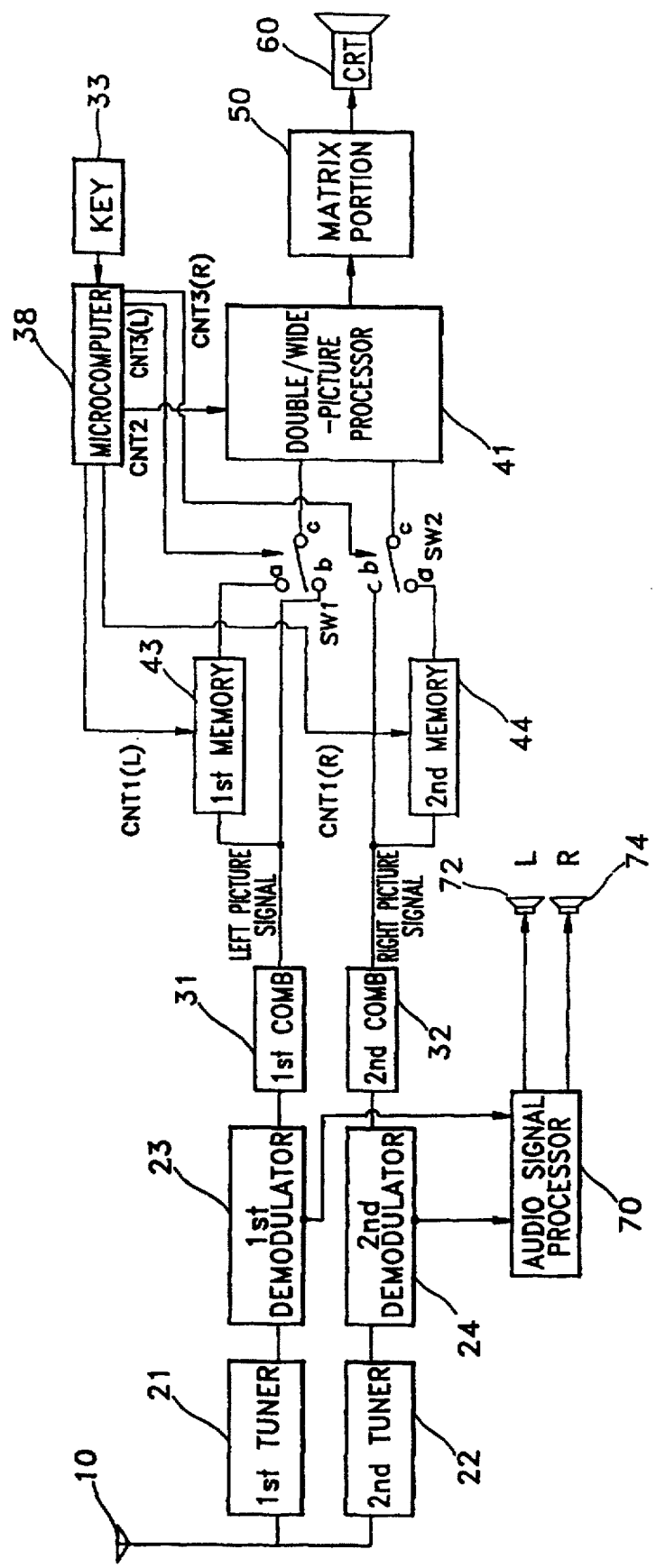
FIG. 1 is a block diagram showing the functional relationship of the components of a picture pause selecting apparatus of a double-wide television according to the present invention.

A picture pause selecting apparatus of a double-wide television according to the present invention shown in FIG. 1 comprises first and second tuners 21 and 22 for converting a carrier wave introduced via an antenna 10 into an intermediate-frequency signal, first and second demodulators 23 and 24 for demodulating audio and video signals from the intermediate-frequency signal, an audio signal processor 70 for processing the audio signal output from first and second demodulators 23 and 24 and outputting the processed audio signal to left (L) and right (R) speakers 72 and 74, first and second comb filters 31 and 32 for separating the video signal output from first and second demodulators 23 and 24 into luminance Y and chrominance C signals, a microcomputer 38 for outputting control signals CNT1(L), CNT1(R), CNT2, CNT3(L) and CNT3(R) according to the input of a key input portion KEY 33, first and second memories 43 and 44 for storing the frames of the video signal by receiving the left picture and right picture signals output from first and second comb filters 31 and 32, first and second switches SW1 and SW2 having contacts a, b and c for selectively outputting the left picture and right picture signals according to control signals CNT3(L) and CNT3(R), a double/wide-picture processor 41 for double/wide-picture-processing each video signal output from first and second switches SW1 and SW2 according to control signal CNT2 of microcomputer 38, a matrix portion 50 for converting the luminance Y and chrominance C signals output from double/wide-picture processor 41 into red R, green G and blue B signals, and a CRT 60 which is driven by RGB signals output from matrix portion 50.

In the double-wide television, a video signal may be displayed in a wide-picture mode with an aspect ratio of 16:9 or two video signals introduced from different signal sources may be simultaneously displayed on the left and right pictures, respectively, formed by dividing the wide-picture.

According to the television of the present invention and as shown by the block diagram of the functional relationship thereof in FIG. 1, first and second tuners 21 and 22 generate intermediate-frequency signals by receiving carrier waves via antenna 10. First and second demodulators 23 and 24 generate audio and video signals by receiving the intermediate-frequency signals output from first and second tuners 21 and 22.

The video signals output from first and second demodulators 23 and 24 are input to first and second comb filters 31 and 32 which separate the input video signals into luminance Y and chrominance C signals to output the left and right picture signals. Correspondingly, audio signal processor 70 separates the audio signals output from first and second demodulators 23 and 24 into signals of left (L) and right (R) channels and then outputs the signals to left (L) and right (R) speakers 72 and 74.

When control signal CNT1(L) of microcomputer 38 is applied to first memory 43, first memory 43 stores a frame of the left picture signal output from first comb filter 31, and when control signal CNT1(R) of microcomputer 38 is applied to second memory 44, second memory 44 stores a frame of the right picture signal output from second comb filter 32.

When contacts c of first and second switches SW1 and SW2 are connected to contacts a by control signals CNT3(L) and CNT3(R), both frames of left and right picture signals stored in first and second memories 43 and 44 are output. When contacts c of first and second switches SW1 and SW2 are connected to contacts b, the left and right picture signals of first and second comb filters 31 and 32 are output. The left and right picture signals output by the switching of first and second switches SW1 and SW2 are input to double/wide-picture processor 41 for processing a wide-picture into two pictures according to control signal CNT2 of microcomputer 38.

Thus, when a user selects the double-picture mode using key input portion 33, control signals CNT3(R) and CNT3(L) output from microcomputer 38 are applied to first and second is switches SW1 and SW2 for connecting contacts c to contacts b, so that the left and right picture signals are received. Simultaneously, control signal CNT2 of microcomputer 38 is applied to double/wide-picture processor 41 to output a double-picture signal. If the user presses a left picture pause button of key input portion 33, which includes left and right picture pause buttons, to pause the left picture in the double-picture mode, microcomputer 38 applies control signal CNT1(L) to first memory 43 to store a frame of the left picture signal in response to the pressing of the left picture pause button. Also, microcomputer 38 applies control signal CNT3(L) to first switch SW1 to connect contact c to contact a, so that a paused picture of a frame output from first switch SW1 is output to the left picture. On the other hand, control signal CNT3(R) of microcomputer 38 controls switch SW2 to connect contact c to contact b, so that a broadcast right picture signal is displayed in the right picture. The paused picture signal and broadcast picture signal selected via the above process are processed into two pictures by double/wide-picture processor 41 and then output to matrix portion 50. Thereafter, the signals input to matrix portion 50 are output as an RGB signal for driving CRT 60. Thus, the user can choose to pause either of the left or right pictures by pressing the left or right picture pause button.

Figure 2:
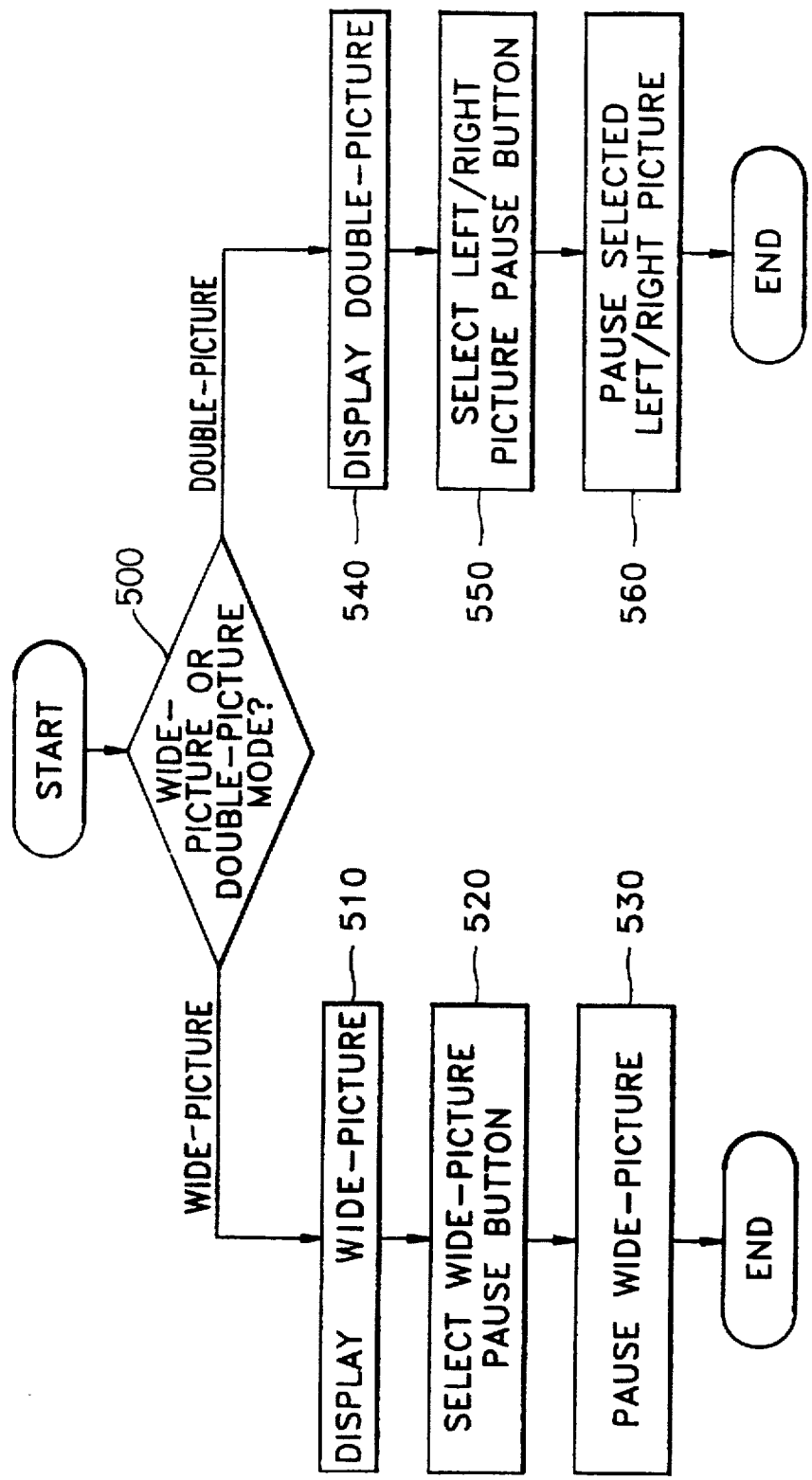
FIG. 2 is a flowchart illustrating the picture pause selecting method of the double-wide television according to the present invention.

FIG. 2 is a flowchart illustrating the picture pause selecting method of the double-wide television adopting the picture pause selecting apparatus according to the present invention.

According to the picture pause selecting method illustrated in FIG. 2, first, it is determined whether a wide-picture mode or a double-picture mode is selected by reading the input of a picture select button of the key input portion 33 (step 500). When the wide-picture mode is selected, the wide-picture is displayed on CRT 60 (step 510). In the wide-picture mode, when a wide-picture pause button is pressed (step 520), microcomputer 38 applies control signals CNT1(L) and CNT1(R) to first and second memories 43 and 44 to store the left and right picture signals therein, respectively, and then the stored signals are output to double/wide-picture processor 41 via first and second switches SW1 and SW2, thereby pausing the wide-picture as is (step 530).

On the other hand, in the step 500, when the double-picture mode is selected, the left and right picture signals are processed into double pictures by double/wide-picture processor 41 shown in FIG. 1, so that two pictures are displayed (step 540).

Then, when the left or right picture pause button is selected using key input portion 33 (step 550), the selected picture is paused (step 560). For pausing the selected picture, the image signal of a frame selected from first and second memories 43 and 44 is stored in a corresponding memory as a paused image. Here, to output the paused image of the picture selected by key input portion 33, microcomputer 38 applies the control signals to first and second switches SW1 and SW2, so that the image signal (paused image) of a frame stored in the memory is output as the paused picture. Also, the other picture may be paused in the same manner as above.

As described above, unlike the conventional double-wide television in which only the right picture can be paused, according to the present invention, when the picture pause button is pressed in the wide-picture mode, the wide-picture can be paused as is, and when the picture pause button is pressed in the double-picture mode, either of the left or right pictures can be paused using the left or right picture pause button.

What is claimed is:

1. A picture pause selecting apparatus of a double-wide television for selectively processing left and right picture signals introduced via an antenna, comprising:

a controller for outputting first through fifth control signals according to the input of a key input portion;

first memory for receiving said left picture signal, storing a frame of said left picture signal according to the first control signal from said controller and reading out said stored frame of said left picture signal;

second memory for receiving said right picture signal, storing a frame of said right picture signal according to the second control signal from said controller and reading out said stored frame of said right picture signal;

a first switch selecting between 1) a paused picture signal of a frame output from said first memory and 2) a broadcast picture signal as an input signal according to the third control signal from said controller;

a second switch selecting between 1) a paused picture signal of a frame output from said second memory and 2) a broadcast picture signal as an input signal according to the fourth control signal from said controller;

a double/wide-picture processor for receiving the signals output from said first and second switches and processing said signals into double pictures or a wide-picture according to the fifth control signal from said controller and outputting a processed signal; and a matrix portion for converting the processed signal output from said double/wide-picture processor into RGB signals.

2. A picture pause selecting method of a double-wide television, comprising the steps of:

(a) selecting a wide-picture mode or a double-picture mode by reading the input of a picture select button of a key input portion;

(b) displaying a wide-picture if the wide-picture mode is selected in said step (a);

(c) pausing the wide-picture according to activation of a wide-picture pause button of the key input portion and said wide-picture mode is selected;

(d) displaying a double-picture if the double-picture mode is selected in said step (a); and (e) pausing a left or right picture according to activation of a left or right picture pause button of the key input portion, respectively and said double-picture mode is selected.

* * * * *